United States Patent [19]

Reinhart et al.

[11] Patent Number: 5,379,801
[45] Date of Patent: Jan. 10, 1995

[54] EXHAUST DIRECTING VALVE MECHANISM FOR A VEHICLE

[75] Inventors: James W. Reinhart; Richard D. Walker, both of Decatur, Ill.

[73] Assignee: Caterpillar Inc., Peoria, Ill.

[21] Appl. No.: 239,168

[22] Filed: May 5, 1994

Related U.S. Application Data

[63] Continuation of Ser. No. 65,959, May 24, 1993, abandoned.

[51] Int. Cl.⁶ ............................................. F16K 11/00
[52] U.S. Cl. .................... 137/876; 137/878; 137/625.47; 298/1 H
[58] Field of Search .................. 137/876, 878, 625.47; 298/1 H

[56] References Cited

U.S. PATENT DOCUMENTS

| | | | |
|---|---|---|---|
| 3,190,584 | 6/1965 | Gire et al. | 137/625.47 X |
| 3,429,339 | 2/1969 | Teichmann | 137/625.47 |
| 3,664,706 | 5/1972 | Chant | 298/1 H |
| 3,731,973 | 5/1973 | Kermode | 298/1 H |
| 3,749,308 | 7/1973 | Fernandes et al. | 137/878 X |
| 3,938,553 | 2/1976 | Ortega | 137/625.47 |
| 3,994,530 | 11/1976 | Zaborsky et al. | 298/1 H |
| 4,002,370 | 1/1977 | Blackmore | 298/1 H |
| 4,909,273 | 3/1990 | Heep et al. | 137/876 X |
| 5,167,257 | 12/1992 | Erpenbeck | 137/875 |

*Primary Examiner*—John C. Fox
*Attorney, Agent, or Firm*—Calvin E. Glastetter

[57] ABSTRACT

Exhaust directing mechanisms are useful for directing exhaust gas flow from an inlet to either a vehicle dump body or a muffler means. A valve mechanism for a vehicle includes a valve body having a valving element mounted within the valve body and being rotatable to a first position upon movement of a dump body to a raised position to direct exhaust from an engine to a muffler. With the dump body in the lowered position the valving element is in the second position to direct exhaust to the dump body. This arrangement of components provides for rotation of the valving element to direct exhaust flow to the dump body or to the muffler.

3 Claims, 4 Drawing Sheets

Fig_1_

Fig_3_

EXHAUST DIRECTING VALVE MECHANISM FOR A VEHICLE

This is a continuation of application Ser. No. 07/065,959, filed May 24, 1993, now abandoned.

TECHNICAL FIELD

This invention relates generally to an exhaust system for a vehicle having a dump body and more particularly to a valve mechanism for directing vehicle engine exhaust gases through either the dump body or through other muffler means.

BACKGROUND ART

Exhaust valve mechanisms are commonly used to direct exhaust gases to a truck dump body when the dump body is in the down position or to a muffler means when the dump body is in the up position. In an example, it is common to use a valve having an external linkage arrangement connected to a member moveable by the truck dump body. An overcenter spring is used to move a valve element to block one of the outlets. One problem associated with such an arrangement is that the linkage arrangement can be costly to produce.

The present invention is directed to overcoming one or more of the problems as set forth above.

DISCLOSURE OF THE INVENTION

In one aspect of the present invention, a valve mechanism includes a valve body having an inlet. The valve body includes a tube having a first outlet and a second outlet. A second tube is rotatively positioned within the first tube of the valve body. The second tube has an outlet rotatable between a first position and a second position. Means are provided for maintaining the second tube in the first position. Means are also provided for rotating the second tube to the second position.

The present invention provides a valve mechanism which is a simple arrangement for directing exhaust gases from the inlet to one of the outlets while blocking the other outlet.

BEST MODE FOR CARRYING OUT THE INVENTION

Figure 1:
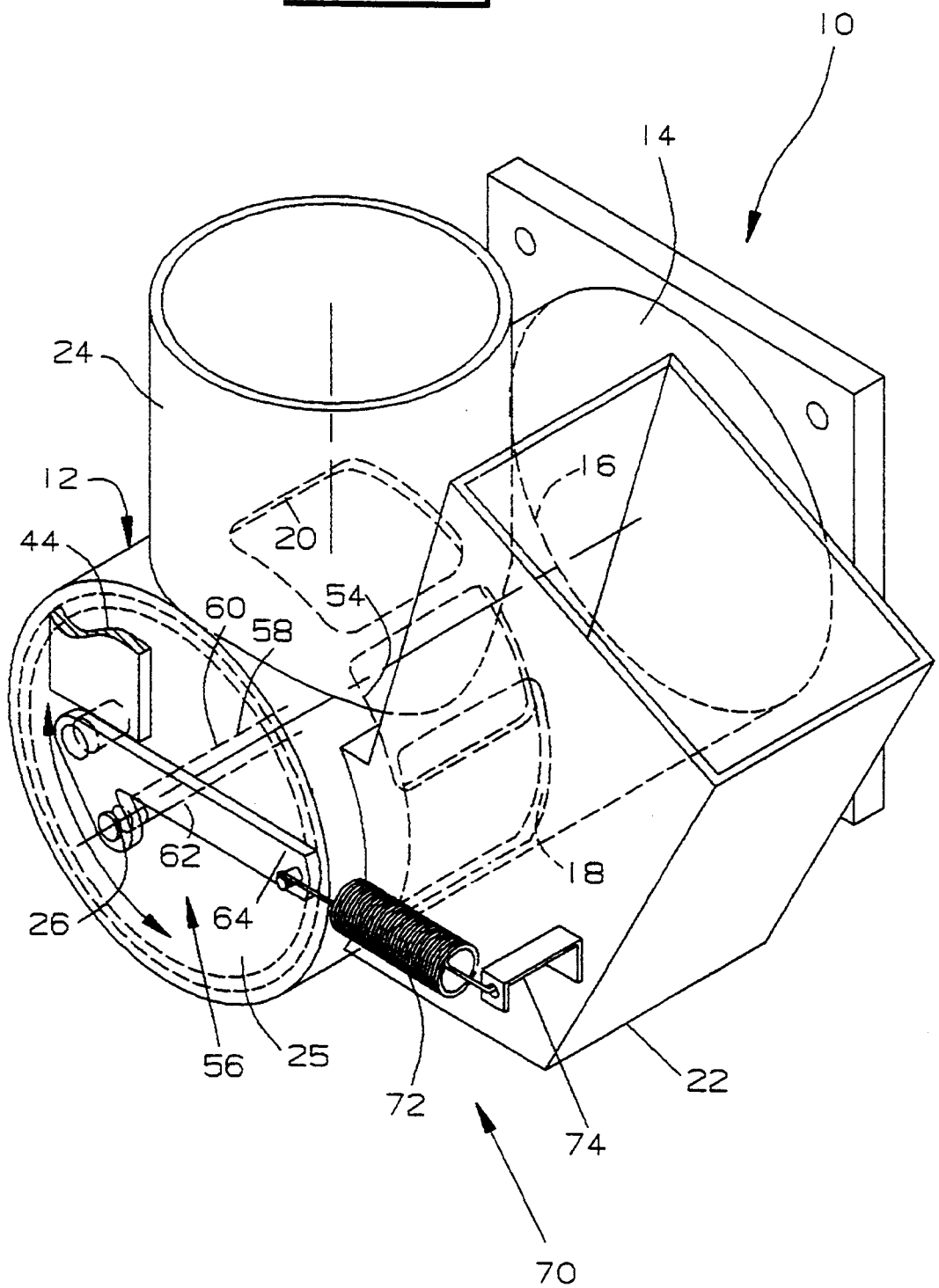
FIG. 1, is a diagrammatic isometric view of the valve of the present invention.
Figure 2:
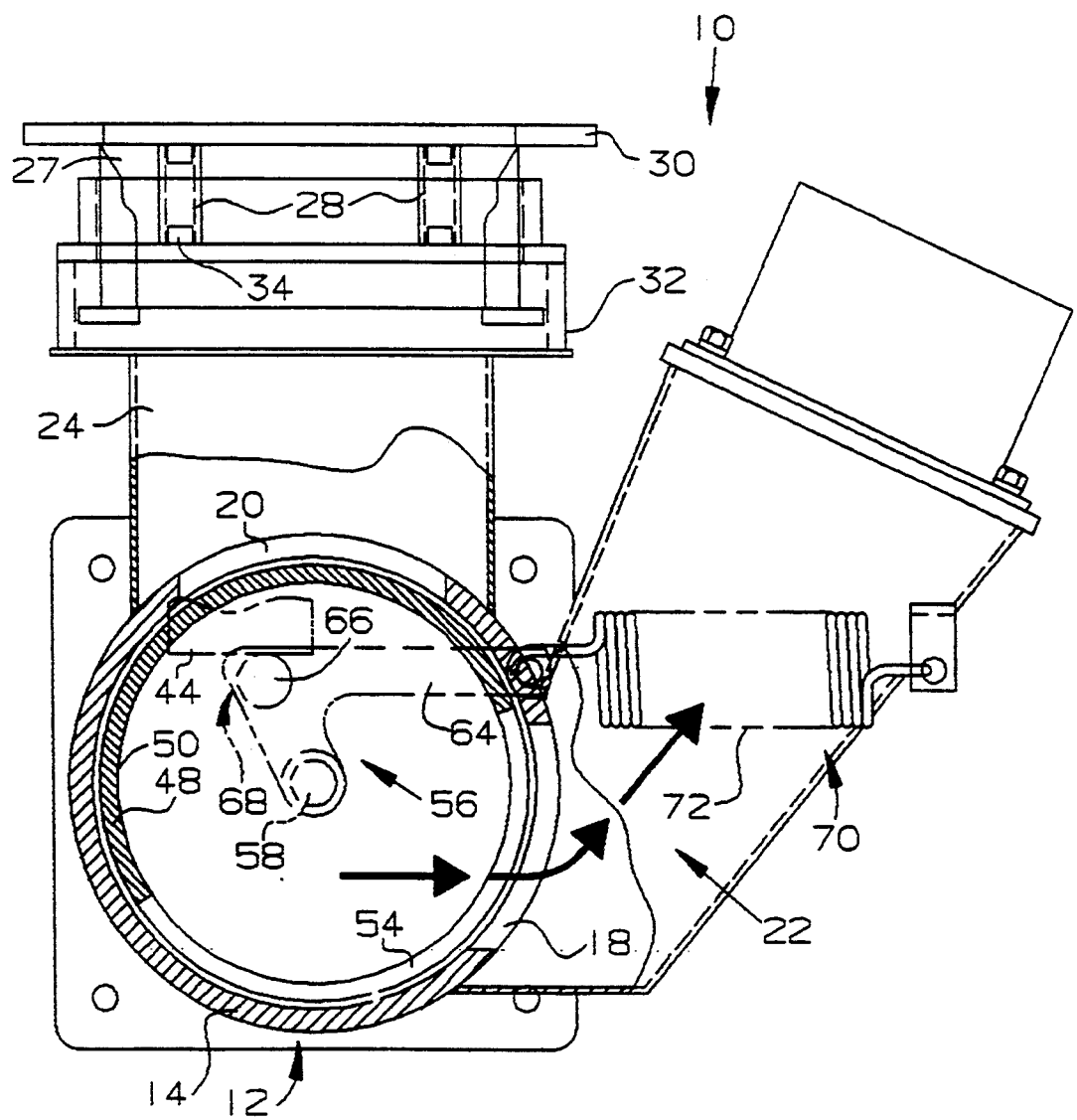
FIG. 2, is a sectional view of the valve with the valving element shown in one position.

Referring now to the drawings, a valve mechanism 10 is disclosed. The valve mechanism 10 includes a valve body 12 having a first cylindrical tube 14. The first cylindrical tube 14 has an inlet 16 through which exhaust gases from an engine (not shown) enters the valve body 12. The first cylindrical tube 14 includes a lateral outlet hole 18 and an upwardly disposed outlet hole 20. The lateral outlet hole 18 communicates exhaust gases into a connector 22 which is connected to a muffler means (not shown). The outlet hole 20 communicates exhaust gases into an upwardly disposed outlet tube 24. An end cap 25 covers the end, opposite of the inlet 16, of the first cylindrical tube 14. The end cap 25 has a central hole 26. A flanged tube 27 is slidably mounted on the outlet tube 24 and is resiliently biased in an upward direction relative to the outlet tube 24 by a plurality of springs 28. The springs are interposed between a flange 30 at the end of the flanged tube 27 and a collar 32 attached to the outlet tube 24. Each of the springs 28 is disposed around an upwardly extending post 34 secured to the collar 32 and a downwardly extending post 36 secured to the flange 30 of the flanged tube 27. The flanged tube 27 is moved and maintained downwardly by a vehicle dump body 42 when the dump body 42 is in the down position. The dump body 42 includes a downwardly projecting actuation plate 44.

The valve mechanism 10 further includes a valving element 46 in the form of a second cylindrical tube 48. The second cylindrical tube 48 is rotatably mounted within the first cylindrical tube 14. The second cylindrical tube 48 has an inlet end 50. A end cap 52 closes a second end of the tube 48. The tube 48 has an outlet 54 which communicates with the outlet hole 18 when in a first position, and communicates with the outlet hole 20 when in a second position. A linkage arrangement 56 is connected to the end cap 52 of the second tube 48. The linkage arrangement 56 includes a shaft 58 having a first end portion 60 attached to the end cap 52 and a second end portion 62 extending therefrom. The second end portion 62 extends through the hole 26 of the end cap 25 of the first tube 14. A lever 64 is attached to the second end portion 62 of the shaft 58. The lever 64 includes an abutment 66 which is positioned to abut the actuation plate 44 of the dump body 42. The actuation plate 44 and linkage arrangement 56 form a means 68 for rotating the valving element 46. A biasing means 70, shown as a spring 72, is positioned and connected between a bracket 74 mounted on the connector 22 and the lever 64 to maintain the second tube 48 in the first position.

Industrial Applicability

Figure 3:
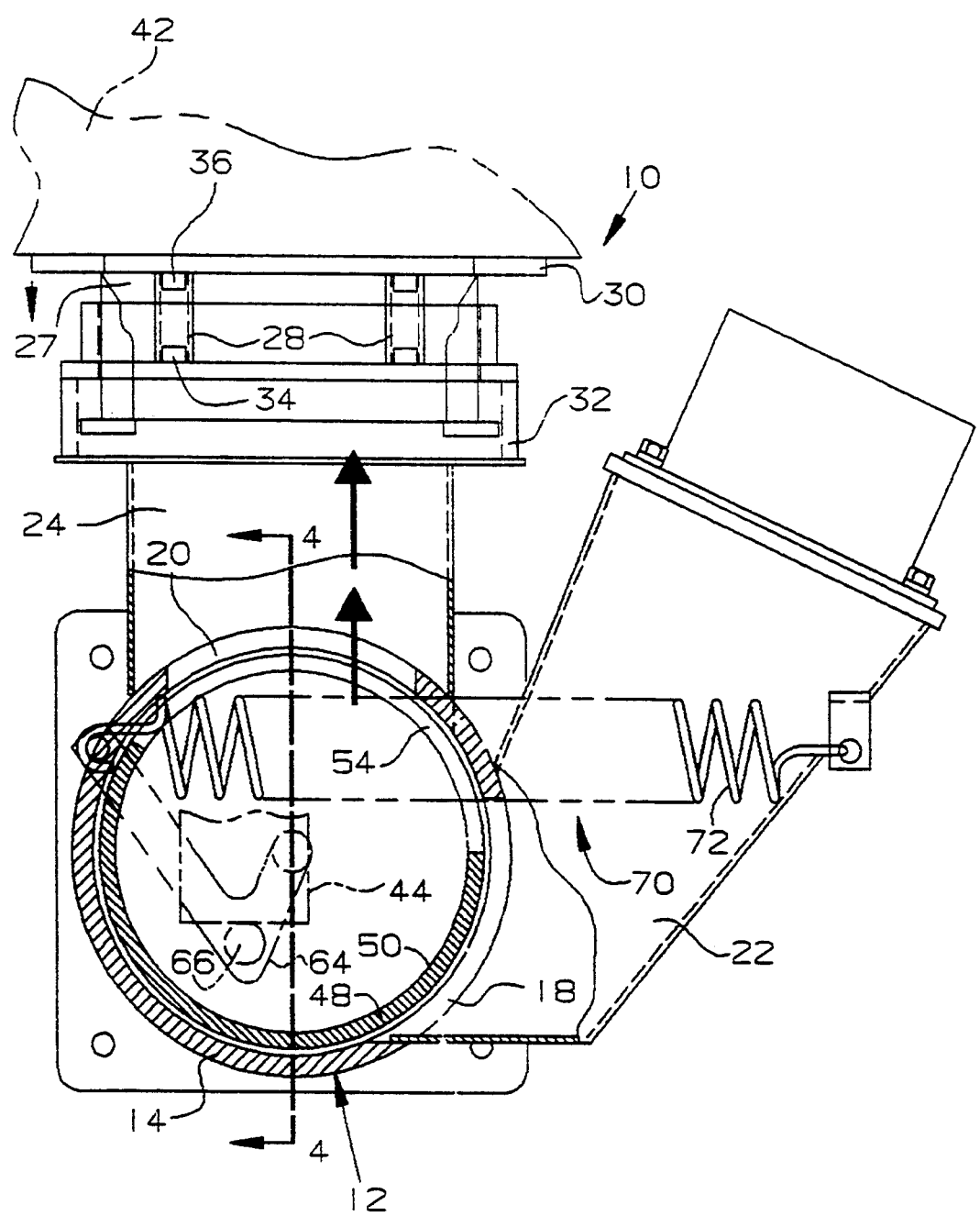
FIG. 3, is a sectional view of the valve shown in FIG. 2, with the valving element shown in a second position.
Figure 4:
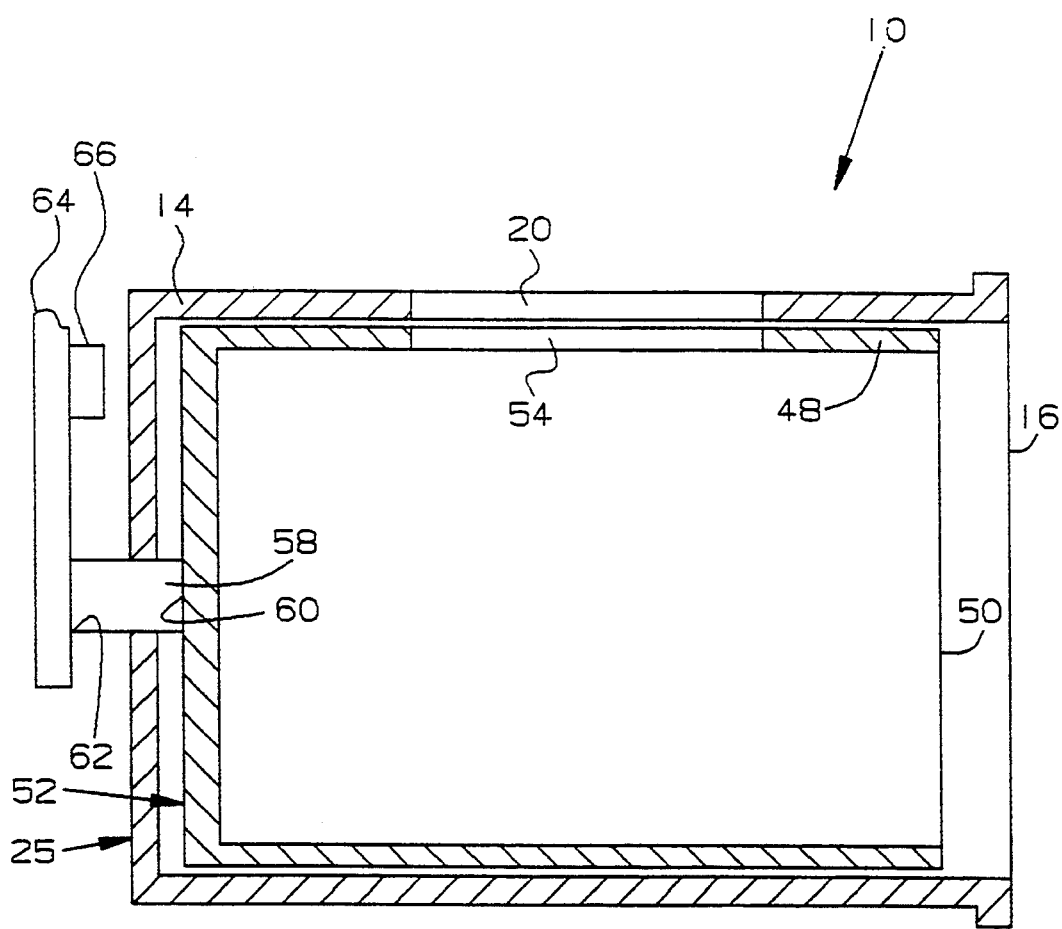
FIG 4, is a sectional view of the valve as taken along the line 4—4 in FIG. 3.

In use of the present invention, the valve mechanism 10 is in the second position when the dump body 42 is in the down position, as shown in FIG. 3. When in the first position, the outlet 54 of the valving element 46 is aligned with the outlet hole 20 to deliver exhaust gas flow to the dump body 42 while blocking the outlet hole 18 and allowing partial flow of exhaust gas to the muffler means.

With movement of the dump body 42 toward the dump position, the actuation plate 44 of the dump body 42 is moved upward. During upward movement of the dump body 42 the spring 72 will rotate the valving element 46 away from the second position. Rotation of the valving element 46 to the first position will block exhaust gas flow into the dump body 42 and exhaust gas will flow through the outlet hole 18 into the muffler means.

As the dump body 42 again moves toward the down position the actuation plate 44 will contact the abutment 66 of the lever 64. Continued downward movement will overcome the force of the spring 72 allowing the lever 64 and the valving element 46 to rotate. Rotation of the valving element 46 aligns the outlet 54 with the outlet hole 20 to again deliver exhaust gas flow to the dump body 42 while partially blocking the outlet hole 18.

In view of the foregoing, it is readily apparent that the structure of the present invention provides a simple low cost exhaust valve mechanism which provides structure to rotate a valving element for directing exhaust flow to a dump body or to a muffler means.

Other aspects, objects and advantages of this invention can be obtained from a study of the drawing, the disclosure and the appended claims.

What is claimed is:

1. A load carrying machine having a dump body movable between a down position and a dump position and structure for directing exhaust to the dump body including a valve mechanism, comprising:

a valve body having an inlet, the valve body includes a first cylindrical tube aligned with the inlet having a lateral first outlet, an upwardly disposed second outlet in communication with the dump body, and an end cap opposite the inlet;

a second cylindrical tube rotatably positioned within the first cylindrical tube of the valve body, the second cylindrical tube having an inlet aligned with the inlet of the valve body and an end cap opposite the inlet to close the second cylindrical tube and an outlet rotatable between a first position and a second position;

means for rotating the second cylindrical tube to the second position, the means includes a linkage arrangement connected to the second cylindrical tube and an abutment plate connected to the dump body which contacts and forces the linkage arrangement to rotate and move the second cylindrical tube to the second position; and a spring connected between the valve body and the linkage arrangement to rotate the second cylindrical tube to the first position when the abutment plate is moved away from the linkage arrangement.

2. The valve mechanism of claim 1, wherein the outlet of the second cylindrical tube is in communication with the first outlet of the valve body when in the first position.

3. The valve mechanism of claim 1, wherein the outlet of the second cylindrical tube is in communication with the second outlet of the valve body when in the second position.

* * * * *